United States Patent [19]

Sorimachi et al.

[11] Patent Number: 4,867,570

[45] Date of Patent: Sep. 19, 1989

[54] THREE-DIMENSIONAL INFORMATION PROCESSING METHOD AND APPARATUS FOR OBTAINING THREE-DIMENSIONAL INFORMATION OF OBJECT BY PROJECTING A PLURALITY OF PATTERN BEAMS ONTO OBJECT

[75] Inventors: Kanehiro Sorimachi, Yokohama; Shigeru Yamada, Chofu; Yasurou Sakamoto, Yokohama, all of Japan

[73] Assignee: Canon Kabushiki Kaisha, Tokyo, Japan

[21] Appl. No.: 289,456

[22] Filed: Dec. 22, 1988

Related U.S. Application Data

[63] Continuation of Ser. No. 938,562, Dec. 5, 1986, abandoned.

[30] Foreign Application Priority Data

Dec. 10, 1985 [JP] Japan ............................ 60-276084
Feb. 13, 1986 [JP] Japan ............................ 61-27912
Jun. 11, 1986 [JP] Japan ............................ 61-136762
Jun. 11, 1986 [JP] Japan ............................ 61-136763
Jun. 11, 1986 [JP] Japan ............................ 61-136764

[51] Int. Cl.$^4$ ............................................ G01B 11/24
[52] U.S. Cl. ......................................... 356/376; 356/2
[58] Field of Search ................... 356/2, 4, 375, 376; 250/558

[56] References Cited

U.S. PATENT DOCUMENTS

| 4,051,483 | 9/1977 | Suzuki | 356/376 X |
| 4,746,790 | 5/1988 | Sorimachi | 250/201 |
| 4,749,848 | 6/1988 | Sorimachi | 250/201 |

FOREIGN PATENT DOCUMENTS

| 0176339 | 4/1986 | European Pat. Off. |
| 2447789 | 9/1975 | Fed. Rep. of Germany |
| 2514930 | 10/1976 | Fed. Rep. of Germany |

Primary Examiner—Eugene R. LaRoche
Assistant Examiner—Robert J. Pascal
Attorney, Agent, or Firm—Fitzpatrick, Cella, Harper & Scinto

[57] ABSTRACT

Apparatus and method for obtaining three-dimensional information about an object, includes a first optical system, a projection device, a second optical system, and an image sensor. A plurality of pattern beams are radiated onto the object through the first optical system. Optical images formed by the pattern beams on the object are received by the image sensor through the second optical system to detect the positions of the received optical images. The distances from the detected positions of the optical images to a plurality of positions on the object are measured, thereby obtaining three-dimensional information about the object.

24 Claims, 11 Drawing Sheets

THREE-DIMENSIONAL INFORMATION PROCESSING METHOD AND APPARATUS FOR OBTAINING THREE-DIMENSIONAL INFORMATION OF OBJECT BY PROJECTING A PLURALITY OF PATTERN BEAMS ONTO OBJECT

This application is a continuation of application Ser. No. 938,562 filed 12/5/86 abandoned.

BACKGROUND OF THE INVENTION

The present invention relates to a three-dimensional information processing method and apparatus and, more particularly, to a three-dimensional information processing method and apparatus for measuring the shape of an object with an active method.

As a conventional method for obtaining information associated with a three-dimensional shape using an image sensor or the like, a light-cutting method (slit method), a stereo method, and the like are known.

In the light-cutting method, slit light is projected onto the surface of an object, and the projected beam is observed from a direction different from the projection direction, thereby obtaining information such as a sectional shape of an object, a distance to the object, and the like. With this method, a plurality of images are imaged slit by slit by a stationary imaging means while the slit projection direction is changed slightly for each projection, thereby obtaining three-dimensional information.

In the stereo method described in U.S. patent application Ser. No. 706,727 filed be the same assignee of the present invention, a pair of two-dimensional imaging elements combined with an optical system and having an equal image magnification are arranged to be separated by a predetermined base length, and two-dimensional images of an object viewed in different directions are obtained thereby. Then, a distance from each position of the object to the imaging system is calculated from a deviation between the two pieces of image information.

In the light-cutting method, however, control of the slit projection direction during imaging is cumbersome, and imaging is time-consuming. Since the three-dimensional information is obtained from a plurality of slit images, a large volume of information is to be processed, and a great deal of time is required for obtaining final information.

In the stereo method, slit scanning control is not required However, the conventional methods normally adopt a passive method. Therefore, when an object has a smooth surface and exhibits a uniform luminance, a contrast between images obtained by two imaging elements is decreased, and distance measurement by comparing two images is rendered impossible. Such a case frequently occurs in a near distance with a large image magnification. Therefore, the shape, color, size, and distance of an object which can be measured are limited.

SUMMARY OF THE INVENTION

It is therefore an object of the present invention to provide a three-dimensional information processing method and apparatus which can perform accurate measurement regardless .of types of objects, and can obtain three-dimensional information of an object, such as a distance to an arbitrary position of an object, in a relatively short period of time.

It is another object of the present invention to provide · a three-dimensional information processing method and apparatus having a wide measurement range.

In order to solve the above problems, an apparatus according to an aspect of the present invention comprises: a plurality of optical systems; means for radiating a plurality of pattern beams (beams having a given cross-section) onto an object through one group of the optical system; and an image sensor for receiving images formed by the pattern beams through another group of the optical system. Distances to the images of the pattern beams on the object are measured in accordance with the positions of optical images on the sensor detected by the image sensor, thereby obtaining three-dimensional information of the object.

In order to solve the above problems, an apparatus according to another aspect of the present invention comprises: a plurality of optical systems whose optical axes are parallel to each other, which are arranged at predetermined base distances from each other, and whose principal planes on the side of an object are matched on a substantially identical plane; means for radiating a plurality of pattern beams onto an object through one group of the optical systems; and an image sensor for receiving images of the pattern beams on the object through another group of the pattern beams Distances to images of the pattern beams are measured in accordance with the positions of the optical images of the pattern beams on the object detected by the image sensor, thereby obtaining three-dimensional information of the object.

Note that the principal plane is a plane which passes through a pair of conjugate points (principal points) providing a lateral magnification of an optical system of 1, and is perpendicular to an optical axis.

In order to achieve the above object, an apparatus according to still another aspect of the present invention comprises: a plurality of optical systems; projection means for radiating a plurality of pattern beams onto an object through one group of the optical systems; and an image sensor for receiving images of the pattern beams on the object through another group of the optical system. Distances to predetermined positions of the object are measured in accordance with the positions of the optical images of the pattern beams on the object detected by the image sensor. The projection means has a light source; a mask having a plurality of light-transmitting portions for forming pattern beams upon reception of light emitted from the light source; a reflection mirror for reflecting at least part of light emitted from the light source to be directed toward the mask; and a light shielding member for partially shielding light emitted from the light source so as to cause a light beam from a direction uniquely determined for each light-transmitting portion to become incident on the corresponding light-transmitting portion.

In order to achieve the above object, an apparatus according to still another aspect of the present invention comprises: a plurality of optical systems; projection means for radiating a plurality of pattern images onto an object through one group of the optical systems; and an image sensor for receiving images of the pattern beams on the object through another group of the optical system. Distances to predetermined positions on the object are measured in accordance with positions of optical images of the pattern beams on the object detected by the image sensor. The projection means is arranged such that when the pattern beams emitted from the projection means pass through the one group of the optical systems, they become sufficiently small beams as compared to a pupil diameter of the optical systems.

In order to achieve the above object, an apparatus according to still another aspect of the present invention comprises: a plurality of optical systems; projection means for radiating a plurality of pattern images onto an object through one group of the optical systems; and an image sensor for receiving images of the pattern beams on the object through another group of the optical system. Distances to predetermined positions on the object are measured in accordance with positions of optical images of the pattern beams on the object detected by the image sensor. The projection means has a light source, a mask for forming pattern beams upon reception of light emitted from the light source, and an elliptic reflection mirror for causing the light emitted from the light source to be directed toward the mask. The light source is arranged outside an optical path of the light beams directed toward the mask.

DETAILED DESCRIPTION OF THE EMBODIMENTS

The present invention will now be described with reference to embodiments in conjunction with the accompanying drawings.

Figure 1:
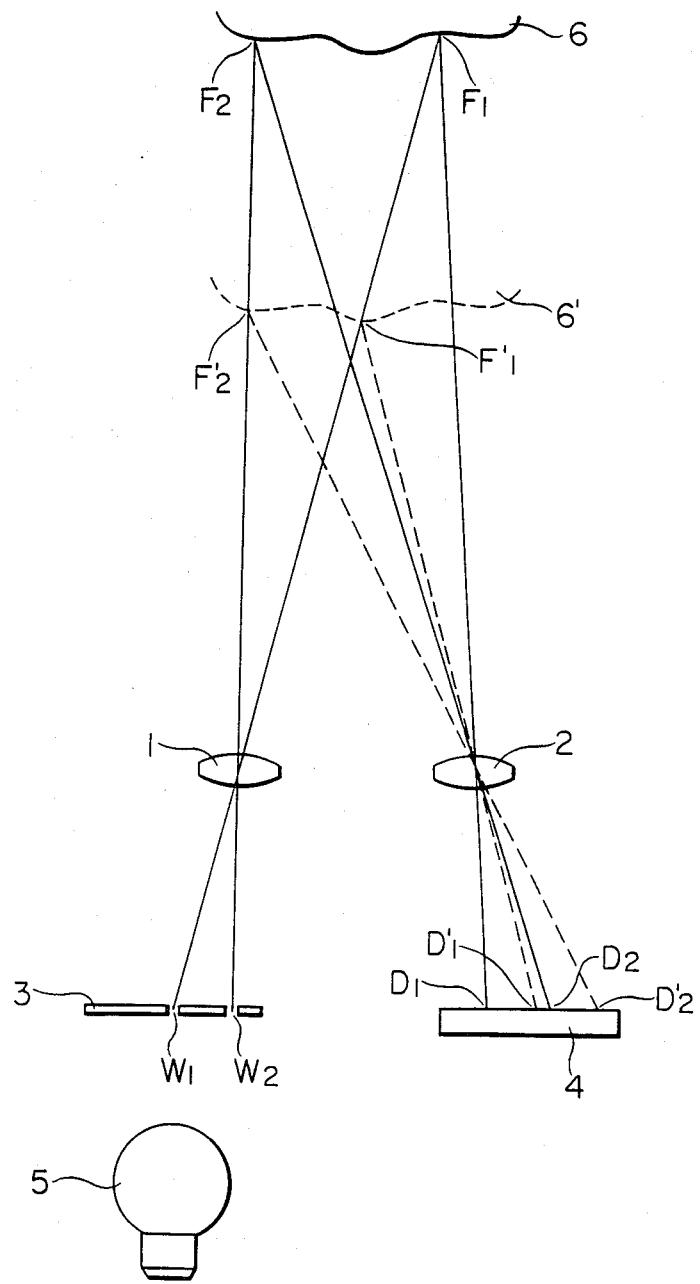
FIG. 1 is a schematic view for explaining a three-dimensional information processing apparatus and method according to a first embodiment of the present invention.

FIG. 1 shows a first embodiment of a measurement apparatus which adopts a three-dimensional information processing methods of the present invention. In FIG. 1, lenses 1 and 2 of the same focal length are arranged with a predetermined base distance therebetween so that their optical axes are parallel to each other. A mask plate 3 and an image sensor 4 consisting of a two-dimensional charge-coupled device are respectively arranged behind the lenses 1 and 2. The mask plate 3 and the image sensor 4 are arranged on the identical plane perpendicular to the optical axes of the lenses 1 and 2.

An illumination light source (e.g., a halogen lamp) 5 is arranged behind the mask plate 3. The lens 1 projects slit patterns of the mask plate 3 onto an object 6 upon illumination of the light source 5.

In FIG. 1, the depths of field of the lenses 1 and 2 can sufficiently cover positions 6 and 6' on the object.

In this embodiment, two optical systems, i.e., an irradiation system consisting of the lens 1 and an image receiving system consisting of the lens 2 are illustrated as single lens systems having the same focal length.

The two optical systems are arranged to be separated by a predetermined base length, and each has a single lens configuration. Their principal planes on the side of the object coincide with a substantially identical plane. In other words, object distances of the two optical systems are equal to each other.

However, when two optical systems having the same focal length are used, conditions in that the principal planes are located on the side of the object on the identical plane and that their optical axes are arranged to be parallel to each other can be most easily attained, and three-dimensional information processing can be facilitated. However, these conditions need not always be satisfied.

Figure 2:
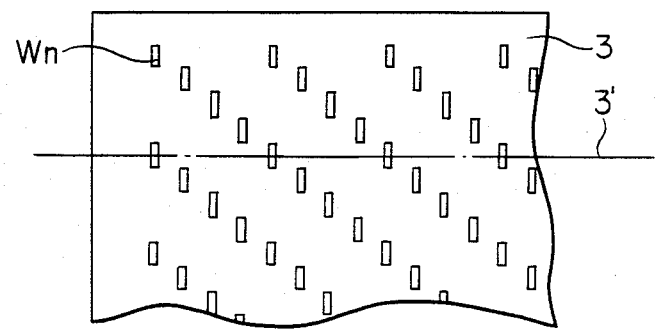
FIG. 2 is an illustration for explaining the arrangement of a mask plate.

FIG. 2 shows an opening pattern of the mask plate 3. In this embodiment, a plurality of rectangular slit-like windows Wn are formed on the mask plate 3. In FIG. 2, the centers of the windows Wn in the lateral direction are aligned at low density in the horizontal direction and at relatively high density in the vertical direction, as indicated by a dotted line 3'. As a result, slit arrays extending obliquely are formed. The density and alignment of the windows Wn can be determined in accordance with a required measurement precision and longitudinal and lateral resolutions of the image sensor 4 used, and hence are not limited to the above arrangement and various patterns can be used. The horizontal density of the windows Wn of the mask plate 3 is set to be relatively low as shown in FIG. 2, since the positions of optical images on the image sensor 4 move in the horizontal direction in accordance with the distance to the object 6, as will be described later. With the above arrangement, a possible distance range for detection can be widened.

In the arrangement shown in FIGS. 1 and 2, light beams passing through windows W1 and W2 of the window Wn illuminated with the light source 5 form optical images at positions F1 and F2 on the object 6 through the lens 1. The optical images F1 and F2 form optical images at positions D1 and D2 on the image sensor 4 through the lens 2.

As can be understood from the principle of the stereo method, the positions of optical images Dn move along a line (a base direction) parallel to the arrangement direction of the lenses 1 and 2 in accordance with the distances to reflection points, i.e., the distances to optical images Fn on the object 6. Therefore, a distance distribution on the surface of the object 6 from the measurement apparatus can be detected as a density distribution of the optical images Dn in the horizontal direction. More specifically, when the output waveform of the image sensor is observed by an image processing apparatus using a computer system, the distances to the optical image positions on the surface of the object 6 can be easily obtained on the basis of the principle of triangulation.

Figure 3:
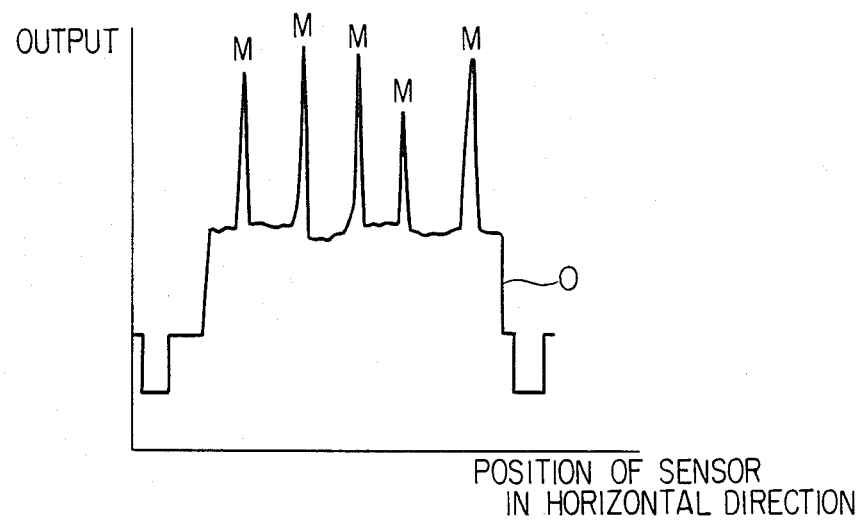
FIG. 3 is a waveform chart for explaining the operation of the arrangement shown in FIG. 1.

FIG. 3 shows an output waveform O of a single scanning line (corresponding to the line 3' in FIG. 2) when a two-dimensional CCD sensor for a TV camera is used as the image sensor 4. In FIG. 3, the right-and-left direction of the figure corresponds to the dimension of the image sensor 4 in the horizontal direction. As can be seen from the above description, an output value exhibits maximum values M in correspondence with the windows Wn on the mask plate 3 located along the same line as the scanning line in FIG. 3. The range of the maximum value of the output waveform corresponding to a single window Wn is limited in the right-and-left direction, and is separated from output value appearing ranges of other windows Therefore, it is easy to obtain correspondence between a specific window Wn and the incident position on the image sensor 4 of a light beam passing through this window. Therefore, measurement will not be rendered impossible due to a decrease in contrast in a near distance range unlike in the conventional stereo method. Since an active method for illuminating using a light source is adopted, the amount of light of the light source can be advantageously reduced for measurement of an object in a near distance range. Furthermore, an inclination of the optical image positions of an object can be determined in accordance with maximum values of the image sensor output.

As described above, the distance from the measurement system to the surface of the object 6 can be measured through the two-dimensional image sensor 4. With the above arrangement, a mechanical scanning operation need not be performed unlike in the light-cutting method, and three-dimensional information on the entire surface of the object 6 can be extracted by a single image scanning operation.

Since post image processing can be performed in association with only an optical image distribution in the right-and-left direction, it can be easily performed at high speed. Furthermore, the optical images on the image sensor 4 are binarized and are output to a CRT display or a hard-copy device, thus allowing visual three-dimensional representation.

The three-dimensional information processing method of the present invention is an optical method which replaces a method wherein a plurality of probes are urged against an object to perceive the shape of the object in accordance with a change in projection amounts of the probes from a reference plane, and can achieve high-speed, accurate processing. The method of the present invention can be applied to a visual sensor of a robot requiring real-time processing. In particular, the method of the present invention is effective when the shape or posture of an object located in a relatively near distance range is perceived to grasp the object or to escape from it. In particular, when the lenses 1 and 2 are arranged so that their principal planes are located on substantially the identical plane, and their object distances are equal to each other, as described above, the following advantages are obtained.

In view of geometrical optics, the geometrical relationship between the mask plate 3, the lens 1, and the object 6 is quite symmetrical with the geometrical relationship between the image sensor 4, the lens 2, and the object 6.

In this case, if the mask plate 3 is replaced with an image sensor, two two-dimensional images of an object received by the two image sensors have the same image magnification and the shapes of the two images have a difference in accordance with the imaging positions (the positions of the lenses 1 and 2). The difference between the shapes of the two-dimensional images is associated with a deviation of images in the right-and-left direction caused by a difference between angles formed by directions of the object and the optical axes of the lenses 1 and 2. Since angles formed by the directions of the object and the optical axes of the lenses 1 and 2 are equal to each other in terms of the vertical direction of the lenses 1 and 2, no image deviation occurs.

The same relationships will be provided in a direction opposite to the light propagation direction. Therefore, the position of the optical image Dn in the right-and-left direction only moves in the base direction in accordance with the distance of the optical image Fn on the object 6.

In the above description, the main part of the apparatus is illustrated in the drawings for the sake of simplicity, and a focusing optical system, e.g., a reflection mirror, a condenser lens, and the like behind the light source, and a shielding housing are omitted. These members can be appropriately arranged by those skilled in the art as needed. In the optical systems, only single lenses are illustrated. However, optical systems comprising of a plurality of elements, or optical systems including a mirror can be used.

Figure 4:
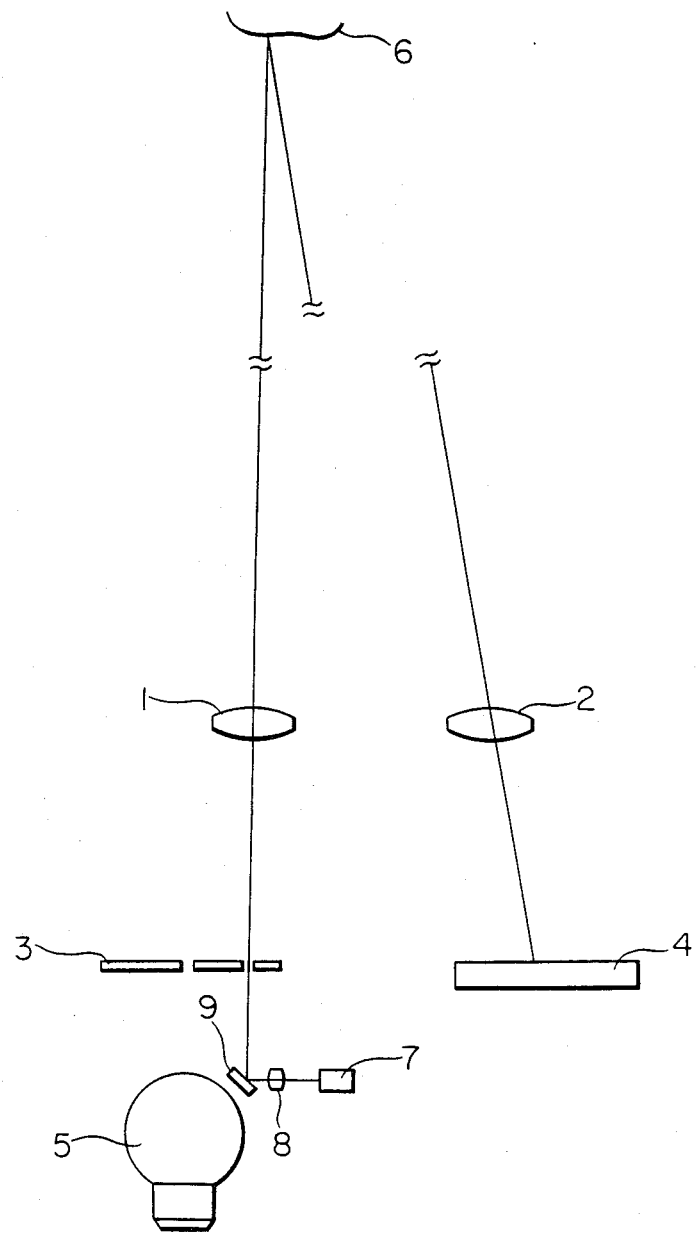
FIG. 4 is a schematic view for explaining a modification of the arrangement of FIG. 1.

FIG. 4 shows a modification of the first embodiment shown in FIGS. 1 and 2. In the aforementioned measurement range within the depths of field of the lenses 1 and 2 in order to achieve accurate measurement. However, the arrangement shown in FIG. 4 can attain control for locating an object within the measurement range prior to detection of three-dimensional information.

Referring to FIG. 4, a semiconductor laser element 7 is arranged as a second light source behind the mask plate 3. A laser beam emitted from the semiconductor element 7 is focused on a focal surface of the lens 1 by the lens 8, is reflected by a reflection mirror 9, and is then projected onto an object 6 through one of windows Wn of the mask plate 3. Other arrangements are the same as those described above.

Figure 5:
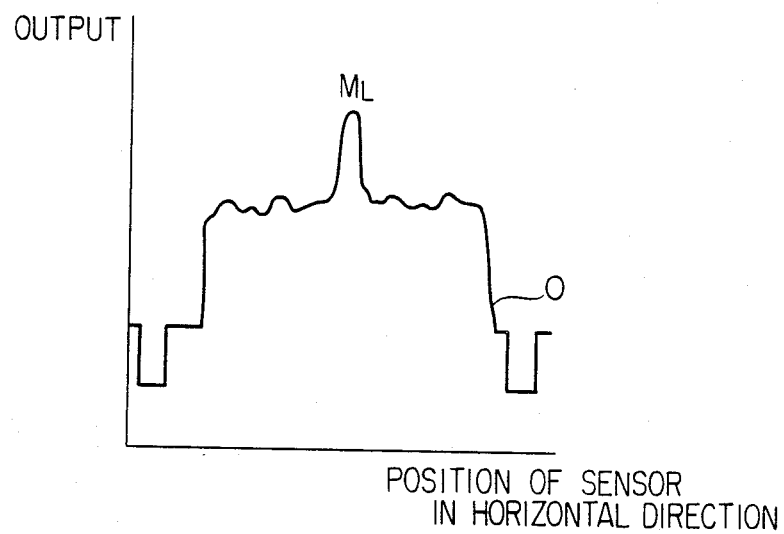
FIG. 5 is a waveform chart showing the operation of the arrangement shown in FIG. 4.

When the object 6 is located outside the measurement range, since it falls outside the focusing positions of the optical systems, images of projection light beams emitted from the light source 5 are largely blurred. However, since the laser beams are projected as parallel light beams by the optical system 8 and the lens 1, they are not so blurred. Since a projection energy density is high, an output waveform O of the image sensor 4 exhibits a high maximum value ML corresponding to an object point image on the object 6, as shown in FIG. 5, and the maximum value ML can be distinguished from other outputs of optical images. Therefore, the distance to a point on the object irradiated with the laser beam is calculated by the principle of triangulation, and can be used as information for locating the object within the measurement range. In the same manner as described above, the distance to the object 6 can be measured as a position of an optical image on the image sensor 4 in the horizontal direction. Therefore, when the measurement system or the object 6 is moved in accordance with the measured distance, the object 6 can be located within the measurement range.

In the first embodiment described previously, two optical systems having the same focal length are used. Alternatively, optical systems having different focal lengths can be used as needed. In this case, in order to facilitate image processing, the objective principal planes of the optical systems, i.e., the irradiation and image-receiving systems, are preferably located on a substantially identical plane so as to reliably prevent optical image movement in directions other than the base direction.

Figure 6:
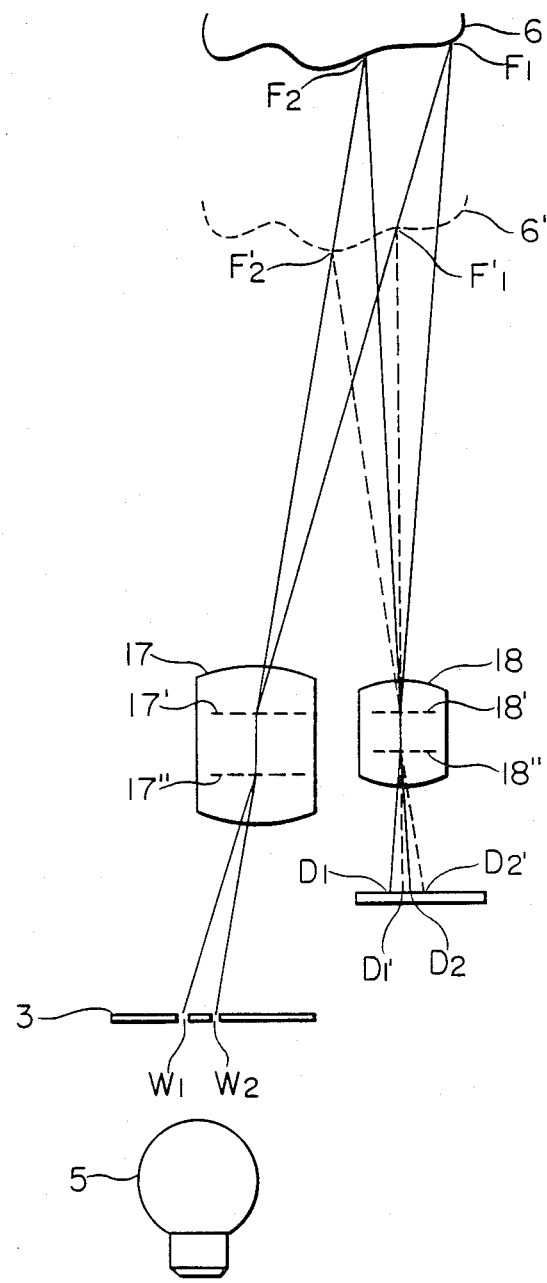
FIGS. 6 and 7 are schematic views for explaining different arrangements of an apparatus and method according to a second embodiment of the present invention.

FIG. 6 shows a second embodiment wherein a lens 17 of an irradiation system and a lens 18 of an image-receiving system have different focal lengths. The same reference numerals in FIG. 6 denote the same parts as described above, and a detailed description thereof will be omitted. In the case of FIG. 6, the lens 17 has a longer focal length than that of the lens 18. Principal planes 17' and 18' of the lenses 17 and 18 on the side of an object are located on a substantially identical plane. Principal planes 17" and 18" on the opposite side have no limitations, and do not coincide with each other in this case.

Distances between a mask 3 and the image sensor 4 and the lenses 17 and 18 are determined so that the mask 3 and the image sensor 4 are located on the focal surfaces of these lenses. In this case, the distances from the lenses 17 and 18 to the mask 3 and the image sensor 4 correspond to the focal lengths of the respective lenses.

With the above arrangement, the projection magnification of the mask pattern of the lens 17 and the imaging magnification of the lens 18 are only different from the arrangement shown in FIG. 1, and the projection state of the light beams and imaging state of the optical images are the same as those in FIG. 1. In this embodiment, the principal planes of the lenses 17 and 18 on the side of the object are preferably arranged on the identical plane so that their object distances are equal to each other. An optical image Dn of a window Wn of the mask plate 3 on the image sensor 4 linearly deviates along a scanning line in the right-and-left direction of the sensor in accordance with the distance of the object, and will not be moved in the up-and-down direction in accordance with the distance of the object. Therefore, the range of positions of the optical image Dn is limited, and this facilitates the post-image processing in the same manner as in the above embodiment.

The arrangement shown in FIG. 6 is effective when a relatively large mask 3 and a relatively small image sensor 4, such as a CCD sensor, must be used.

When the mask 3 is used in an equal magnification system as in the first embodiment, it must have the same size as that of the sensor 4 and the windows Wn must be formed at a density corresponding to the resolution of the sensor. However, formation of such a small mask poses a technical problem. It is difficult for a small mask area to project pattern beams having a sufficient amount of light with respect to the object. This limits the measurement range of the object, or a light source having an excessively large amount of light is required.

Therefore, a relatively large mask 3 and a relatively small image sensor 4 are preferably used. In this case, magnification conversion can be realized by the arrangement shown in FIG. 6.

In the arrangement in FIG. 6, the same image processing can be performed as in the above embodiment. Although an optical image obtained by the image sensor 4 is reduced, its perspective in the up-and-down direction will not be shifted in a direction different from the scanning line, and the same easy three-dimensional information processing is allowed.

Figure 7:
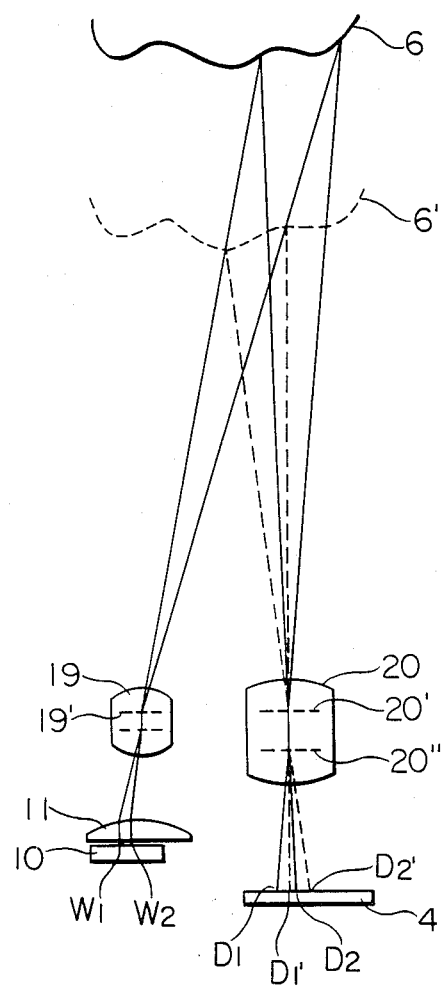

In contracts to FIG. 6, the focal length of an irradiation lens 19 can be shortened and the focal length of an image-receiving lens 20 can be increased, as shown in FIG. 7. The conditions for principal planes 19' and 20' of the lenses on the side of the object, and the like are the same as those in FIG. 6. In this case, a light source array 10 in which point sources such as a surface emission type semiconductor laser array or an LED array are aligned like windows Wn in FIG. 2, is used. Referring to FIG. 7, W1 and W2 are not windows as in the above description but are light sources in the light source array 10. An LED or semiconductor laser array which is normally formed in a large number on a substrate and is separated for use can be used as the light source array 10.

Since light emitted from the light source array normally has a high emission intensity in a given direction, a condenser lens 11 add the like is preferably arranged adjacent to the light source array in accordance with conditions, such as an effective diameter of the lens 19, and the like, so that light from the light source is effectively directed toward the lens 19.

With the above arrangement, three-dimensional information can be obtained through the same processing although the magnifications are different from those in FIG. 6. In this case, limitations associated with an irradiation system comprising of the light source array 10 and an image-receiving system comprising of the image sensor 4 can be moderated, so that a system design with further advantageous manufacturing conditions is achieved.

Figure 8:
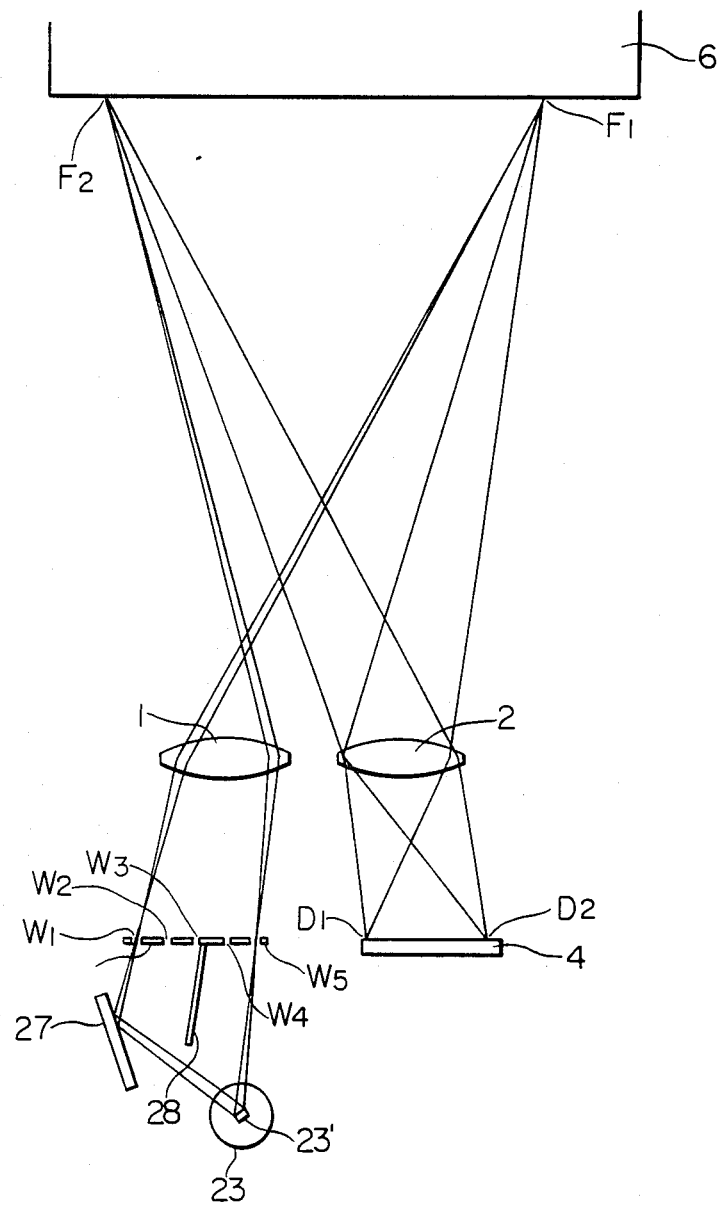
FIG. 8 is a schematic view for explaining an apparatus and method according to a third embodiment of the present invention.

FIG. 8 schematically shows an optical system according to a third embodiment of the present invention. The same reference numerals in FIG. 8 denote the same parts as described above, and a detailed description thereof will be omitted.

A light source 23 preferably has a relatively small emission section 23'. A reflection mirror 27 reflects part of light emitted from the light source 23. A light-shielding member 28 is arranged at substantially the center of a mask 3 so as to shield part of light emitted from the light source 23, so that a direct light component from the light source 23 and a light component directed toward the mask 3 through the reflection mirror 27 do not become incident on identical light-transmitting portions W1, W2 and W3.

In the arrangement shown in FIG. 8, light beams emitted from the light source 23 and passing through light-transmitting portions W1 and W5 propagate through a lens 1, and respectively form optical images at positions F1 and F2 on an object 6 in accordance with the position of the object 6. The optical images F1 and F2 respectively form optical images at positions D1 and D2 on an image sensor 4 through a lens 2.

In this embodiment, in order to widen a possible distance-measurement range, depths of field of the lenses 1 and 2 are widened and specific pattern beams are radiated to the object 6. More specifically, in FIG. 8, the light-transmitting portions W1, W2, W3, W4 and W5 of the mask 3 can be regarded as point sources. Therefore, when opening patterns of the mask 3 are illuminated by a normal illumination technique, light components emerging from the respective light-transmitting portions W1, W2, ... W5 are diffused and pass through the entire pupil of the lens 1 to be directed toward the object 6 through the lens 1. When the pattern beams are radiated onto the object 6 with this method, even if the lens 1 having a large depth of field is used, the resultant distance-measurement range is limited, and blurred optical images of the opening patterns are formed on the image sensor 4, thereby making position detection of the optical images impossible.

However, in this embodiment, the light source 23 is arranged to be separated from the mask 3, and the light-shielding member 28 is arranged at substantially the center of the mask 3, so that the light-transmitting portions W4 and W5 on the right side of the light-shielding member 28 are illuminated with direct light from the light source 23 and the light-transmitting portions W1, W2 and W3 on the left side of the light-shielding member 28 are illuminated with light via the reflection mirror 27. More specifically, the light-transmitting portions W1, W2 and W3 on the left side of the member 28 do not receive the direct light from the light source 23, and the light-transmitting portions W4 and W5 on the right side of the member 28 do not receive the light from the reflection mirror 27. Therefore, the light beams incident from given directions pass through the respective portions W1, W2, W3, W4 and W5 of the mask 3. Then, these beams become incident on the lens 1 as thin light beams, and a plurality of pattern beams are directed toward the object 6. In this embodiment, since a relatively small light emitting section 23' is used in the light source 23, a direct light component or a light component reflected by the reflection mirror 27 is diffused at a small diffusion angle. Therefore, the pattern beams radiated on the object 6 become thin light beams through the mask 3. Even if the distance to the object 6 is largely changed, the optical images of the light-transmitting portions W1, W2, ... projected on the image sensor 4 are not so blurred. In this way, when a projection means is only slightly modified, a possible distance-measurement range can be greatly widened.

Figure 9:
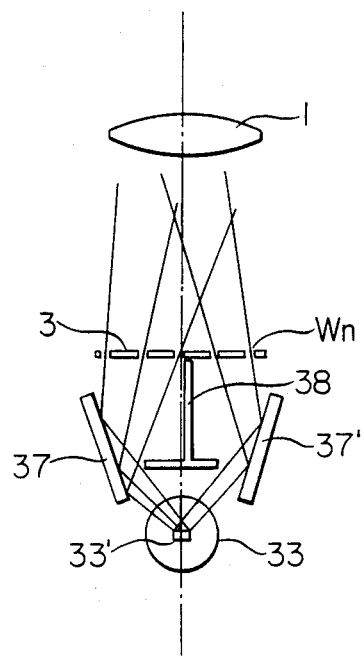
FIG. 9 is a schematic view for explaining a modification of the arrangement shown in FIG. 8.

FIG. 9 shows a modification of the projection means of the apparatus shown in FIG. 8. A light-emitting section 33' of a light source 33 is arranged along the extended line of the optical axis of a lens 1, and two reflection mirrors 37 and 37' are used to direct light beams from the light source 33 toward a mask 3, thereby obtaining pattern beams. In the projection means of this modification, a light-shielding member 38 is also arranged between the mask 3 and the light source 33, so that a plurality of light-transmitting portions Wn of the mask 3 only receive light beams reflected by the reflection mirrors 37 and 37' to be directed toward given directions. The pattern beams converted to thin light beams through the mask 3 are incident on the pupil of the lens 1. Therefore, when the projection means of this modification is used as that in the distance-measurement apparatus shown in FIG. 8, the same effect as in the above embodiment can be obtained.

As a reflection mirror, a special shape mirror, e.g., an elliptic mirror or a corner cube, can be used in addition to a flat mirror shown in the above embodiment. In this case, a light-shielding means is arranged at a predetermined position so that a direct light component from the light source and a light component through the reflection mirror do not become incident on identical light-transmitting portions.

Figure 10:
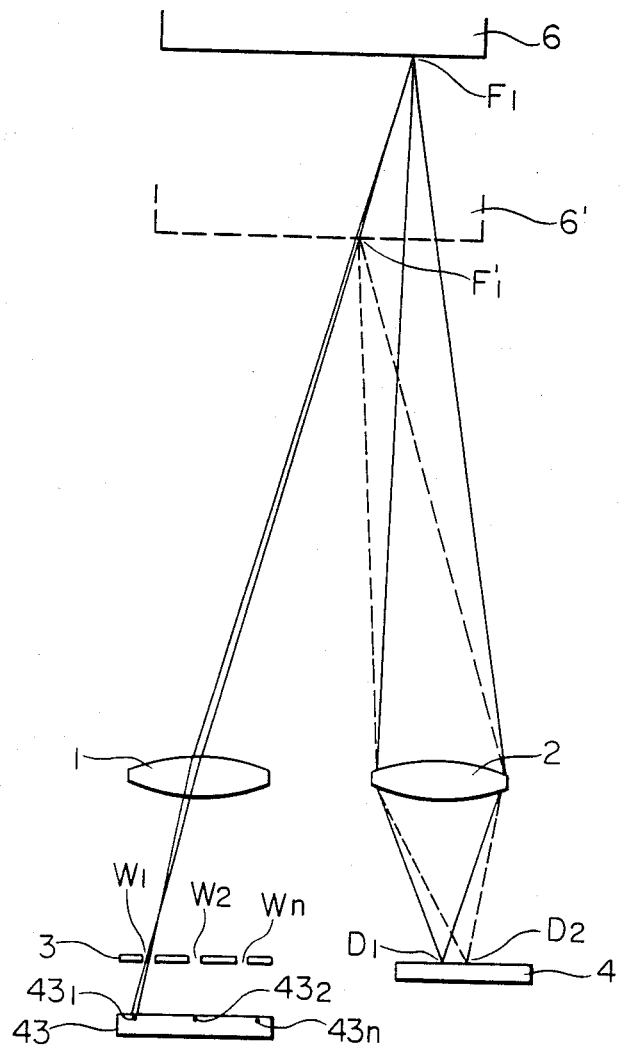
FIG. 10 is a schematic view for explaining an apparatus and method according to a fourth embodiment of the present invention.

FIG. 10 shows a fourth embodiment of the present invention. The same reference numerals in FIG. 10 denote the same parts as in the above embodiments, and a detailed description thereof will be omitted.

A light source device 43 consists of a plurality of small light-emitting sources $43_1$, $43_2$, ... $43_n$, e.g., light emitting diodes, laser diodes. or the like, which are arranged on a substrate.

In this embodiment, in order to widen a possible distant range, the depths of field of lenses 1 and 2 are widened and specific pattern beams are radiated on an object 6. More specifically, in FIG. 10, light-transmitting portions W1, W2, ... Wn of a mask 3 can be regarded as point sources, and pose a similar problem to that described in the third embodiment in a normal illumination technique.

However, in this embodiment, the light source device 43 is arranged at a position separated from the mask 3, and light components emitted from the small light-emitting sources $43_1$, $43_2$, ..., $43_n$ pass through the corresponding light-transmitting portions W1, W2, ..., Wn and become incident on the pupil of the lens 1. With this arrangement, a plurality of pattern beams obtained through the mask 3 have a small beam spot size as compared with the pupil aperture of the lens 1, and hence, very thin light beams are directed toward the object 6. Therefore, even if the object 6 is located at a position considerably separated from a just-focus position, blurring of optical images on an image sensor 4 can be suppressed. In this embodiment, lines connecting the small light-emitting sources $43_1$, $43_2$, ..., $43_n$ and the corresponding light-transmitting portions W1, W2, ..., Wn pass through the vicinity of the center of the lens 1, and light components other than those from the corresponding small light-emitting sources and incident on the light-transmitting portions W1, W2, ..., Wn are not incident on the pupil of the lens 1. Note that the thickness of the mask 3 can be increased or a light-shielding frame can be provided between the adjacent light-transmitting portions W1, W2, ..., Wn, if necessary, so that the small light-emitting sources $43_n$ and the light-transmitting portions Wn can reliably provide a one-to-one correspondence.

In this embodiment, even if the object 6 is present in a near distance range, if it is located within a measurement range, the respective components are arranged so that light-source images are not formed on the object 6 in a just-focus state. Within the measurement range, distance measurement can be performed with high precision.

In the above description, pattern beams on the object 6 are formed by the light sources and the mask 3. However, when a plurality of point sources having a directivity are arranged at a planar position of the mask 3, the same effect can be obtained.

Figure 11:
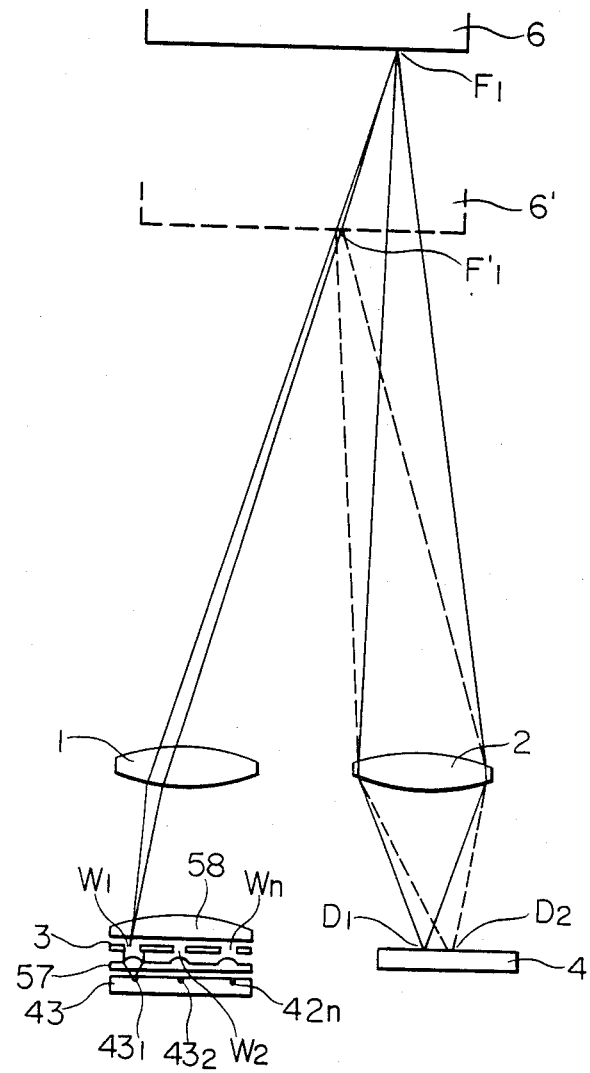
FIG. 11 is a schematic view for explaining an apparatus and method according to a fifth embodiment of the present invention.

FIG. 11 shows a distance-measurement apparatus according to a fifth embodiment of the present invention. The same reference numerals in FIG. 11 denote the same parts as in the above embodiments. The apparatus of this embodiment includes a lens array 27 comprising small convex lenses, and a field lens 58.

The distance-measurement apparatus of this embodiment has the same basic arrangement as that of the apparatus shown in FIG. 10, and the distance measurement principle is also the same as in FIG. 10. A difference from the embodiment shown in FIG. 10 is the arrangement of a projection means for obtaining pattern beams. As shown in FIG. 11, the lens array 57 which has the small convex lenses to provide a one-to-one correspondence with small light-emitting sources $43_1$, $43_2$, ..., $43_n$ on a light source device 43 is arranged between the light source device 43 and a mask 3. Furthermore, a field lens 58 is arranged behind the mask 3 so that the light beams passing through the mask 3 are reliably incident on the pupil of the lens 1. More specifically, light components emitted from the small light-emitting sources $43_1, 43_2, \ldots, 43_n$ are focused upon operation of the corresponding small convex lenses of the lens array 57, and are efficiently directed toward the light-transmitting portions W1, W2, ..., Wn of the mask 3. Therefore, the amount of pattern beams obtained through the mask 3 can be increased, and bright opening pattern images of the mask 3 can be projected onto an image sensor 4, thus improving measurement precision. In this embodiment, light beams passing through the light-transmitting portions W1, W2, ..., Wn are diffused at a small diffusion angle, and pattern beams as thin light beams are incident on the object 6. Therefore, even if positions F1, F1' of the object 6 are largely separated from each other, opening pattern optical images on the image sensor 4 are not so blurred, thus always allowing high measurement accuracy.

Note that the field lens 58 can be omitted in accordance with a matching method of the positions of the light-transmitting portions W1, W2, ..., Wn of the mask 3, the lens array 57, and the small light-emitting sources $43_1, 43_2, \ldots, 43_n$ of the light source device 43, as shown in FIG. 10.

In the above embodiment, an array of small light-emitting sources (LEDs) mounted on a single substrate is used as a light source. However, normal separate parts can be aligned or separate parts sealed with convex lens-like glasses can be aligned to omit the lens array 57 in FIG. 11. Alternatively, the substrate of the small light-emitting source array can be sealed with a convex lens array-like transparent material.

Figure 12:
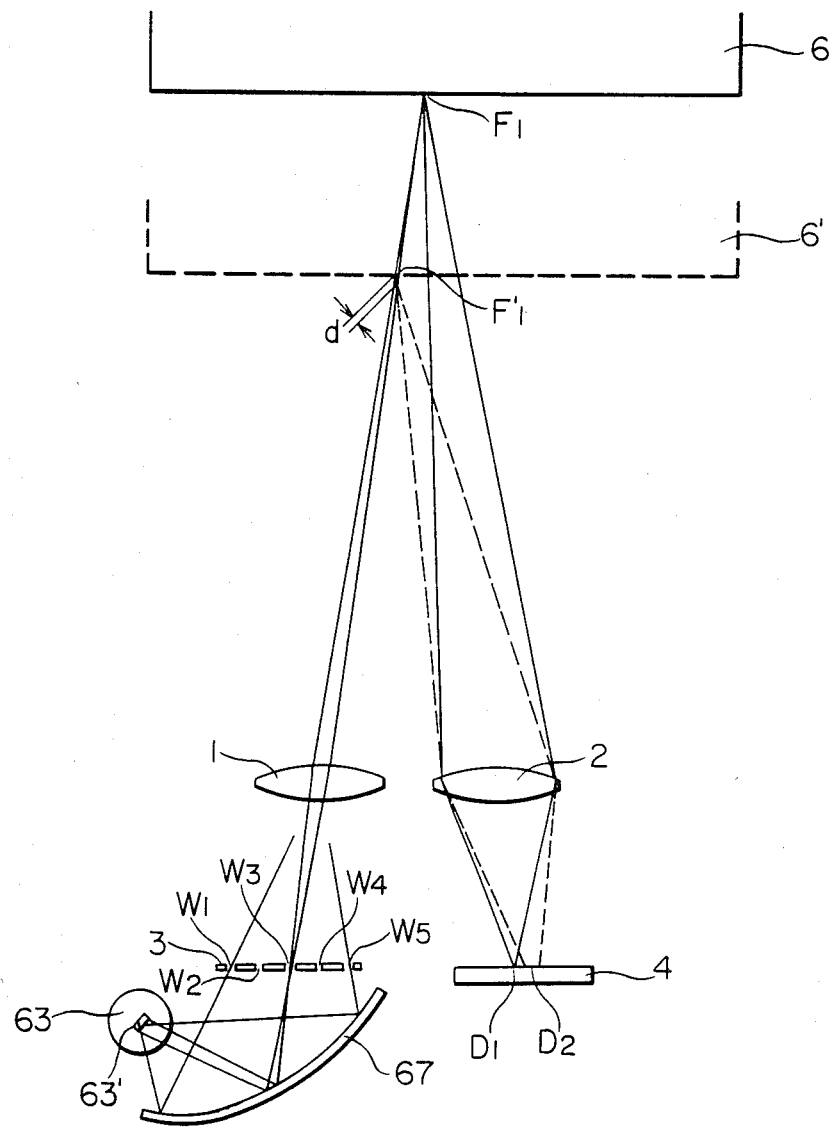
FIG. 12 is a schematic view for explaining an apparatus and method according to a sixth embodiment of the present invention.

FIG. 12 shows a sixth embodiment of the present invention The same reference numerals in FIG. 12 denote the same parts as in the above embodiments, and a detailed description thereof will be omitted.

A light source 63 preferably has a relatively small light-emitting section 63'. An elliptic reflection mirror 67 reflects part of light from the light source 63.

In this embodiment, the light source 63 is arranged at a position separated from a mask 3 and outside the optical path of light beams reflected by the elliptic reflection mirror 67 for directing the light from the light source 63 toward the mask 3, so that light beams propagating in predetermined directions are incident on light-transmitting portions W1, W2, ..., W3 of the mask 3. Furthermore, in this embodiment, the light source 63 (the small light-emitting section 63') is arranged at the first focal point of the elliptic reflection lens 67, and the second focal point of the reflection lens 67 coincides with the center of the entrance pupil of the lens 1. All the plurality of pattern beams obtained through the mask 3 can be radiated onto the object 6 through the lens 1.

In an illumination technique using an elliptic reflection mirror used in a conventional projector, a direct light component from a light source and a reflected light component illuminate a mask to increase the amount of light incident on the mask surface. In this case, the reflected and direct light components have different incident directions with respect to the mask. Therefore, when the object 6 is located at a position separated from a just-focus position as indicated by an irradiation point F1', the reflected and direct light components causes a difference in irradiation positions on the object. As a result, two points on the object are irradiated with light beams. Therefore, a difference is also caused in image-receiving positions on the image sensor 4, and causes trouble in detection of the image-receiving positions to measure object distances. The reflected light component may pass through a glass tube sealing the light source and illuminate the mask 3. In this case, the numerical aperture (NA) of the light beams of the light-transmitting patterns of the mask 3 projected on the object 6 is increased, and the opening patterns of the mask 3 radiated onto the object at a position separated from the just-focus position are considerably blurred, as described previously.

With the arrangement shown in FIG. 12, a light component emitted from the light source 63 and directly illuminating the mask 3 is not incident on the lens 1. Therefore, light beams for forming the light-transmitting portion patterns of the mask 3 on the object 6 are only light components which are emitted from the light source 63, reflected by the elliptic reflection mirror 67, and focused near the center of the entrance pupil of the irradiation lens 1. The numerical aperture of light beams passing through single points of the light-transmitting portions W1, W2, ..., Wn of the mask 3 corresponds to a possible angle of a mirror image formed by reflecting the small light-emitting section 63' of the light source 63 on the reflection mirror 67. A light beam passing through one point of the light-transmitting portion W3 has a small diffusion angle, as indicated by the solid line in FIG. 12. As a result, the width of blurring at a position F1'separated from the just-focus position can be decreased as indicated by d. From the characteristics of the elliptic reflection mirror described above, since a light beam passing through the light-transmitting portion W5 at the edge portion of the mask 3 is directed toward the center of the entrance pupil of the lens 1, the aperture of the lens can be reduced without causing an eclipse by the lens 1. Furthermore, a holding member or a glass sealing member of the light source 63 can be arranged outside the optical path of the light beam reflected by the elliptic reflection mirror 67 and incident on the lens 1, thus eliminating variations in amount of light passing through the light-transmitting portions of the mask 3.

As shown in FIG. 12, the elliptic reflection mirror can be formed by a portion of an elliptic mirror, or the elliptic mirror as a whole can be disposed. The first optical system, preferably, its entrance pupil, is located near the second focal point of the elliptic mirror, so that thin light beams free from the influence of an aberration can be obtained. More specifically, almost all the light beams emerging from the mask 3 preferably pass through the vicinity of the optical axis of the first optical system 1.

In the above embodiment, two optical systems having the same focal lengths are used. However, three optical systems having different focal lengths can be used as needed. Note that identical optical systems having uniform aberrations and the same focal length can provide the simplest arrangement.

In the above embodiments, optical images of a plurality of pattern beams formed by a plurality of two-dimensionally arranged light-transmitting portions are detected by a two-dimensional image sensor, e.g., a CCD to perform measurement. For example, a plurality of light-transmitting portions are arranged at equal intervals, so that a plurality of pattern beams formed thereby are projected onto an object. Then, optical images of the pattern beams are received by an image sensor having a sensor array in its longitudinal direction to detect the shape of an object along a specific direction.

A plurality of second optical systems for receiving pattern beams from an object are arranged to widen a distance measurement field. Furthermore, when the second optical system is subjected to parallel movement by a predetermined driving device, the distance measurement field can be widened. Conversely, a first optical system for radiating a plurality of pattern beams onto an object and a projection means can be subjected to parallel movement by a predetermined driving device to obtain the same effect as described above.

Pattern beams radiated onto an object are preferably thin light beams having a diffusion angle as small as possible. However, since its limit mainly depends on the sensitivity of an image sensor, the sensitivity of a sensor to be used, a light source output, and a required measurement precision are determined in correspondence with specifications of an apparatus.

The magnification or the base length of the optical system, i.e., the distance between the first and second optical systems shown in FIG. 1, the pitch of the light-transmitting portions of the mask, and the like can b determined with regard to a range to be measured.

An image sensor described in the present invention includes all the photoelectric conversion elements, such as photodiodes, CCDs, and the like, and is not limited to in its alignment, such as a one-dimensional or two-dimensional array.

To summarize, it is important to radiate a plurality of pattern beams onto an object and to detect optical images formed by images of the pattern beams on the object using a sensor, thereby obtaining three-dimensional information of the object from detected positions. In this case, since the correspondence between the optical image on the sensor and a generation source of the pattern beams is apparent, distance information of a plurality of positions on the source of the object can be calculated by the principle of triangulation, thus obtaining three-dimensional information of the object. This calculation technique is essentially the same as that described in U.S. patent application Ser. No. 706,727.

What is claimed is:

1. A three-dimensional information processing apparatus which measures distances from a reference position to a plurality of positions on an object to obtain three-dimensional information regarding the object, said apparatus comprising:
   a first optical system having a principal plane on the object side thereof, and having an optical axis;
   projection means for radiating a plurality of pattern beams onto the object through said first optical system;
   a second optical system having a principal plane on the object side thereof, the principal planes of said first and second optical systems being located in a substantially identical plane, said second optical system having an optical axis substantially parallel to the optical axis of said first optical system; and
   a sensor for receiving a plurality of optical images on a surface thereof, said optical images formed by the plurality of pattern beams reflected by said object, through said second optical system, and being separated from each other, and for respectively detecting positions of the received optical images on said receiving surface.

2. An apparatus according to claim 1, wherein focal lengths of said first and second optical systems are equal to each other.

3. An apparatus according to claim 1, wherein said sensor is arranged to be perpendicular to the optical axis of said second optical system.

4. An apparatus according to claim 1, wherein said sensor is arranged on a focal plane of said second optical system.

5. An apparatus according to claim 1, wherein said projection means has a mask member having a plurality of light-transmitting portions arranged on the focal plane of said first optical system, and a light source arranged at a side of said light-transmitting portions opposite to said first optical system.

6. An apparatus according to claim 1, wherein said projection means has a plurality of point sources arranged on the focal surface of said first optical system.

7. An apparatus according to claim 1, further comprising parallel beam projection means for projecting a parallel beam to the object through said first optical system.

8. An apparatus according to claim 1, wherein focal lengths of said first and second optical systems are different from each other.

9. An apparatus according to claim 1, wherein said projection means has a light source, a mask member having a plurality of light-transmitting portions for forming the plurality of pattern beams upon reception of light emitted from said light source, deflection means for deflecting at least part of the light emitted from said light source toward said mask member, and light-shielding means for shielding part of the light emitted from said light source so as to cause light beams propagating in directions uniquely corresponding to said light-transmitting portions respectively to be incident on said corresponding light-transmitting portions.

10. An apparatus according to claim 1, wherein said projection means is arranged so that each of the plurality of pattern beams is formed as a thin light beam as compared to a pupil diameter of said first optical system and passes through said first optical system.

11. An apparatus according to claim 1, wherein said projection means is arranged so that the plurality of pattern beams pass through the vicinity of the optical axis of said first optical system.

12. An apparatus according to claim 5, wherein said plurality of light-transmitting portions of said mask member are arranged at a relatively low density along a direction corresponding to a moving direction of optical images on said sensor in accordance with the distance to the object, and are arranged at a relatively high density along a direction perpendicular to the moving direction.

13. An apparatus according to claim 7, wherein said parallel beam projection means has a laser light source, and optical means for focusing laser light from said laser light source onto the focal plane of said first optical system.

14. An apparatus according to claim 8, wherein the focal length of said first optical system is larger than that of said second optical system.

15. An apparatus according to claim 8, wherein the focal length of said first optical system is smaller than that of said second optical system.

16. An apparatus according to claim 9, wherein said light-shielding means is arranged at substantially the center of said mask member, and wherein said deflection means comprises a reflection mirror arranged on one side of said light-shielding means, and wherein said light source is arranged on the other side of said light-shielding means.

17. An apparatus according to claim 9, wherein said light source is arranged on an extended line of the optical axis of said first optical system, and wherein said light-shielding means is arranged between said mask member and said light source, and wherein said deflection means comprises two reflection mirrors arranged on both sides of said light-shielding means.

18. An apparatus according to claim 10, wherein said projection means has a mask member having a plurality of light-transmitting portions, and a light source having a plurality of light-emitting portions having a one-to-one correspondence with said light-transmitting portions for illuminating said mask member.

19. An apparatus according to claim 18, wherein said projection means further comprises a lens array arranged between said mask member and said light source, and having small convex lens portions in correspondence with said light-emitting portions.

20. An apparatus according to claim 11, wherein said projection means comprises a mask member having a plurality of light-transmitting portions, a light source, and an elliptic reflection mirror for directing light from said light source toward said mask member, said light source being arranged outside an optical path of light beams directed toward said mask member.

21. An apparatus according to claim 20, wherein said light source and said first optical system are respectively arranged at two focal points of said elliptic reflection mirror.

22. A three-dimensional information processing method in which distances from a reference position to a plurality of positions on an object are measured to obtain three-dimensional information regarding the object, said method comprising the steps of:
radiating a plurality of pattern beams onto the object through a first optical system;
receiving a plurality of optical images on a predetermined receiving surface, said optical images being formed by the plurality of pattern beams reflected by the object, through a second optical system, and being separated from each other, to respectively detect positions of the received optical images on said receiving surface, said second optical system having an optical axis substantially parallel with an optical axis of the first optical system, the principal planes of said first and second optical systems on the object side being substantially identical; and
measuring distances from the reference position to the plurality of positions on the object based on the positions of the optical images detected by the receiving step to obtain three-dimensional information regarding the object.

23. A distance measuring method comprising the steps of:
disposing first and second optical systems at a distance from an object, said first and second optical systems having substantially parallel optical axes and substantially co-planar principal planes on the side of the object;
radiating a plurality of pattern beams onto an object through the first optical system;
receiving a plurality of optical images on a predetermined receiving surface, said optical images being formed by the plurality of pattern beams reflected by said object and passed through said second optical system, and being separated from each other, to respectively detect positions of the received optical images on said receiving surface; and
measuring the distance regarding said plurality of positions on said object based upon the positions of the optical images detected in the receiving step.

24. A distance measuring device comprising:
a light source;
means for forming a plurality of light emitting points arranged two-dimensionally with respect to the light from the light source;
a projection lens for forming images of the plurality of light emitting points formed by said forming means onto an object;
a two-dimensional sensor array providing an output signal;
an imaging lens for imaging again a plurality of emitting point images formed on the object onto the light-receiving surface of the two-dimensional sensor array, the optical axis of the imaging lens being substantially parallel with the optical axis of the projection lens and the principle planes of the imaging lens and the projection lens on the side of the object being set in a substantially identical plane, distance information regarding the plurality of positions on said object being related to the output signal from two-dimensional sensor array.

* * * * *

UNITED STATES PATENT AND TRADEMARK OFFICE
CERTIFICATE OF CORRECTION

PATENT NO. : 4,867,570

DATED : September 19, 1989

INVENTOR(S) : Sorimachi, et al.

It is certified that error appears in the above-identified patent and that said Letters Patent is hereby corrected as shown below:

COLUMN 1:

Line 52, change "required" to --required.--.

COLUMN 2:

Line 29, change "beams" to --beams.--.

COLUMN 3:

Line 65, "methods" should read --method--.

COLUMN 4:

Line 1, change "consisting" to --comprising--.

Line 2, delete "of".

Lines 14 and 15, change "consisting of" to --comprising--.

COLUMN 5:

Line 18, change "ranges" to --in ranges--.

UNITED STATES PATENT AND TRADEMARK OFFICE
CERTIFICATE OF CORRECTION

PATENT NO. : 4,867,570

DATED : September 19, 1989

INVENTOR(S) : Sorimachi, et al.

It is certified that error appears in the above-identified patent and that said Letters Patent is hereby corrected as shown below:

COLUMN 6:

Line 29, delete "of". (1st occurrence)

Line 32, change "aforementioned mea-" to --aforementioned arrangement, the object 6 must be located in a mea- --.

COLUMN 8:

Line 3, change "contracts" to --contrast--.

Line 20, change "add" to --and--.

Lines 29 and 30, delete "of".

COLUMN 11:

Line 36, change "invention" to --invention.--.

Line 41, change "light" to --the light--.

COLUMN 12:

Line 18, change "only" to --the only--.

UNITED STATES PATENT AND TRADEMARK OFFICE
CERTIFICATE OF CORRECTION

PATENT NO. : 4,867,570
DATED : September 19, 1989
INVENTOR(S) : Sorimachi, et al.

It is certified that error appears in the above-identified patent and that said Letters Patent is hereby corrected as shown below:

COLUMN 13:

Line 24, change "b" to --be--.

COLUMN 16:

Line 43, change "principle" to --principal--.

Line 48, change "two-dimensional sensor array" to --said two-dimensional sensor array--.

Signed and Sealed this

Ninth Day of April, 1991

Attest:

HARRY F. MANBECK, JR.

*Attesting Officer*  *Commissioner of Patents and Trademarks*